US010019269B2

(12) United States Patent
Wang et al.

(10) Patent No.: US 10,019,269 B2
(45) Date of Patent: Jul. 10, 2018

(54) STANDALONE AUTOMATION DEVICE AND A MACHINE

(71) Applicant: ABB Schweiz AG, Baden (CH)

(72) Inventors: Xiaobo Wang, Zhejiang (CN); Liang He, Zhejiang (CN); Huan Shi, Zhejiang (CN); Zhe Liu, Zhejiang (CN); Axel Lohbeck, Zhejiang (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/781,173

(22) PCT Filed: Jul. 4, 2014

(86) PCT No.: PCT/CN2014/081660
§ 371 (c)(1),
(2) Date: Sep. 29, 2015

(87) PCT Pub. No.: WO2016/000260
PCT Pub. Date: Jan. 7, 2016

(65) Prior Publication Data
US 2016/0124758 A1    May 5, 2016

(51) Int. Cl.
G06F 1/32       (2006.01)
G06F 9/445      (2018.01)
(Continued)

(52) U.S. Cl.
CPC .......... *G06F 9/44505* (2013.01); *G06F 1/266* (2013.01); *G06F 13/385* (2013.01);
(Continued)

(58) Field of Classification Search
None
See application file for complete search history.

(56) References Cited

U.S. PATENT DOCUMENTS

2003/0005196 A1    1/2003  Reed
2006/0190238 A1*   8/2006  Autor .................... G06F 13/105
                                                      703/25
(Continued)

FOREIGN PATENT DOCUMENTS

CN    101099333 A    1/2008
CN    201203651 Y    3/2009
(Continued)

OTHER PUBLICATIONS

FT230X USB to Basic UART IC Datasheet Version 1.2, Feb. 14, 2013, Future Technology Devices International Limited, pp. 1-44.*
(Continued)

*Primary Examiner* — Paul Yanchus, III
(74) *Attorney, Agent, or Firm* — Taft Stettinius & Hollister LLP

(57) ABSTRACT

A standalone automation device (100) comprises: a removable memory port (101), configured to transmit data between the device (100) and the equipment (200) which also has a removable memory port; a removable memory control unit (102), comprising a signal convertor (112) for converting a removable memory interface to a serial interface; a power supply unit (103), configured to provide power supply when the device (100) is connected to the equipment (200) and disconnected to the field, and an isolation unit (104), configured to isolate the power supply. Compared with the existing prior arts, the proposed solution is convenient for connecting with the computer or cellphone, especially with isolation solution for power supply.

12 Claims, 2 Drawing Sheets

(51) Int. Cl.
*G06F 13/38* (2006.01)
*G06F 1/26* (2006.01)
*G06F 13/42* (2006.01)
*G05B 19/00* (2006.01)

(52) U.S. Cl.
CPC .......... *G06F 13/4282* (2013.01); *G05B 19/00* (2013.01); *Y02D 10/14* (2018.01); *Y02D 10/151* (2018.01)

(56) References Cited

U.S. PATENT DOCUMENTS

| | | | |
|---|---|---|---|
| 2007/0297148 A1* | 12/2007 | Gaub | H05K 7/1478 361/728 |
| 2008/0192881 A1* | 8/2008 | Newell | G01T 7/00 377/54 |
| 2009/0265057 A1 | 10/2009 | Chinnadurai et al. | |
| 2012/0209447 A1* | 8/2012 | Hortig | G06F 1/266 700/298 |
| 2012/0221155 A1 | 8/2012 | Miles et al. | |
| 2013/0107409 A1 | 5/2013 | McGee et al. | |
| 2014/0281063 A1* | 9/2014 | Martini | G06F 13/385 710/63 |

FOREIGN PATENT DOCUMENTS

| | | |
|---|---|---|
| CN | 201203652 Y | 3/2009 |
| CN | 102007734 A | 4/2011 |
| CN | 102422273 A | 4/2012 |
| CN | 102789298 A | 11/2012 |
| CN | 203350863 U | 12/2013 |
| CN | 103617140 A | 3/2014 |
| DE | 102009044182 A1 | 5/2010 |
| JP | 2007249625 A | 9/2007 |

OTHER PUBLICATIONS

ISA/CN International Search Report dated Dec. 30, 2014 re PCT Application No. PCT/CN2014/081660, filed Jul. 4, 2014.
Extended European Search Report, European Patent Application No. 14885072.0, dated Feb. 15, 2017, 7 pages.
Office Action, European Patent Application No. 14885072.0, dated Jan. 24, 2018, 5 pages.
First Chinese Office Action, Chinese Patent Application No. 201480017615.3, dated Apr. 3, 2018, 10 pages including Machine Translation in English.
Chinese Search Report, Chinese Patent Application No. 201480017615.3, dated Apr. 3, 2018, 5 pages including Machine Translation in English.

* cited by examiner

STANDALONE AUTOMATION DEVICE AND A MACHINE

FIELD OF THE INVENTION

Embodiments of the present disclosure generally relate to a standalone automation device, and more particularly relate to a standalone automation device with removable memory connecting and a machine used in the field.

BACKGROUND OF THE INVENTION

Standalone automation device is widely used as control device for small range process control. Single loop or multi-loop controller is typical application for standalone automation device. Normally, it contains several input/output ports and configurable common process control algorithm (such as PID). With input/output connected to field signal and process control algorithm configured, user can establish a control loop and control the process variable to desired set point.

In many cases standalone automation device can work individually, with configuration and operation by buttons in front panel. However, there are two main inconvenient in configuration. Firstly, the display with two lines LED characters is limited for transferring information; only abbreviations can be used as interaction with users. Secondly, standalone automation device has only several buttons in limited front panel space with basic operation functions, which will lead to inconvenience for hardware and control logic configuration.

Another disadvantage is that, for many applications, standalone automation device are embedded in other machine panels in daily operation. If firmware version of standalone automation device is required to be updated or users need additional features in the future after device is embedded in machine panels, dismantling device from machine panels to update firmware with rear connections is quite inconvenient.

In view of the foregoing, there is a need in the art to develop an improved standalone automation device to support convenient communication and power supply.

SUMMARY OF THE INVENTION

The object of the present invention is to provide a new solution for standalone automation device, so as to solve or at least partially mitigate at least a part of problems in the prior art, and to improve usability, security and reliability.

According to one aspect of the invention, there is provided a standalone automation device. The device comprises: a removable memory port, configured to transmit data between the device and the equipment which also has a removable memory port; a removable memory control unit, comprising a signal convertor for converting a removable memory interface to a serial interface; a power supply unit, configured to provide power supply when the device is connected to the equipment and disconnected to the field, and an isolation unit, configured to isolate the power supply.

According to a preferred embodiment of the present invention, the isolation unit comprises a transformer to isolate the power supply.

According to a preferred embodiment of the present invention, the isolation unit is further configured to isolate the signals with a magnetic coupler.

According to a preferred embodiment of the present invention, the magnetic coupler comprises a single or dual channel digital isolator IC.

According to a preferred embodiment of the present invention, the removable memory port is a USB, a mini-USB or a micro-USB port, and the signal convertor is a USB to UART convertor.

According to a preferred embodiment of the present invention, the USB to UART convertor is capable of switching the power supply of the device between the normal mode and the low current mode.

According to a preferred embodiment of the present invention, the USB to UART convertor is configured to switch on or switch off a MOSFET for switching the power supply of the device between the normal mode and the low current mode.

According to a preferred embodiment of the present invention, the USB, the mini-USB or the micro-USB port is arranged in the front panel of the device.

According to a preferred embodiment of the present invention, the USB, the mini-USB or the micro-USB port is covered by a rubber cap.

According to a preferred embodiment of the present invention, the USB to UART convertor comprises a full speed USB to basic UART IC, which offers a compact bridge from USB2.0 full speed interfaces to basic UART interfaces.

According to a preferred embodiment of the present invention, the device (100) further comprises a display and an input means for display, controlling and monitoring.

According to a preferred embodiment of the present invention, the device is capable of connecting to the equipment through a common cable.

According to a preferred embodiment of the present invention, the equipment is a computer or a cellphone.

According to a preferred embodiment of the present invention, the device is capable of being configured, monitored, and firmware/features updated by the equipment.

According to another aspect of the invention, there is provided a machine used in the field, comprising: the standalone automation device, which is removably embedded into the machine panel.

Compared with the existing prior arts, the solution for standalone automation device can achieve several advantages as below.

Firstly, by providing front panel removable memory port, user only needs to plug in dedicate cable and connect device with PC.

Secondly, in normal cases, a standalone automation device needs 220V AC or 24V AC/DC power supply for control and operation. The power supply terminals are in the rear part of device. In many cases standalone device needs pre-configuration before embedding and setting to process for control task. Front removable memory port with power supply allows standalone automation device to finish configuration without 220V AC or 24V AC/DC power supply from field. The power supply solution also has protection circuit to avoid low power load ability which may lead to damage of electronic components or uncertainty configuration mistakes.

Thirdly, by removable memory port (USB as an example) in front panel, user can easily connects standalone automation device with PC. In PC configuration interface, all the functions in standalone automation device can be configured easily by input the options or numbers directly. After configuration, automation device can be disconnected with PC and execute process control and monitoring functions.

Fourthly, by removable memory port in front panel, process data can be transmitted to PC interface for monitoring and analysis. User can set or change control parameters according to process history trend.

Fifthly, the standalone automation device is used for industrial process control, often in 220V AC environments. Therefore channel isolation is quite important, especially for front panel removable memory port which may touch by users. In this invention, removable memory is isolated with MCU inside device, so that common cable is available and no special isolation cable is needed.

BRIEF DESCRIPTION OF THE DRAWINGS

The above and other features of the present disclosure will become more apparent through detailed explanation on the embodiments as illustrated in the description with reference to the accompanying drawings, throughout which like reference numbers represent same or similar components and wherein.

DETAILED DESCRIPTION OF PREFERRED EMBODIMENTS

Hereinafter, solutions as provided the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Figure 1:
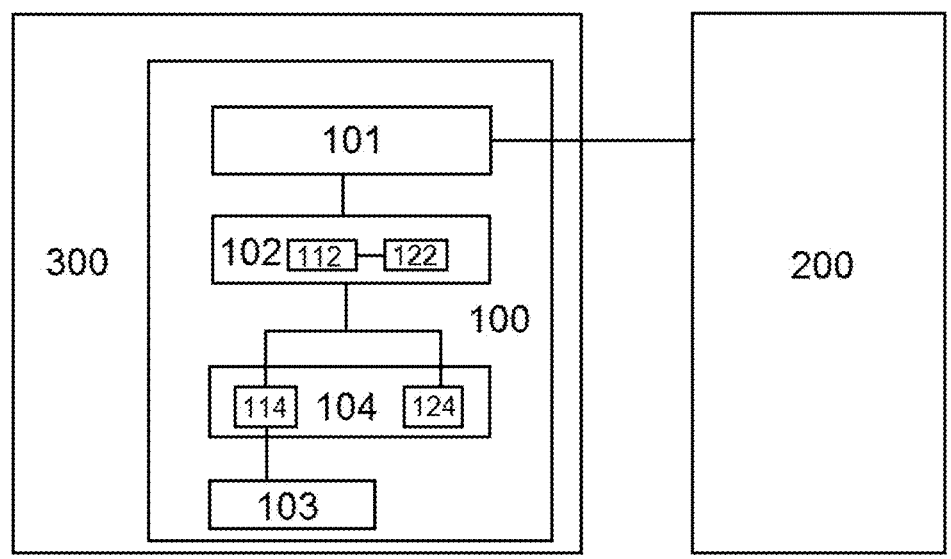
FIG. 1 schematically illustrates a block diagram of a standalone automation device according to an embodiment of the present disclosure.

Next, reference will be made to FIG. 1 to describe an example of the block diagram of a standalone automation device according to an embodiment of the present disclosure which can be implemented. As illustrated in FIG. 1, a standalone automation device 100 comprises a removable memory port 101, a removable memory control unit 102, a power supply unit 103 and an isolation unit 104. The removable memory port 101 is configured to transmit data between the device 100 and an equipment 200, such as a computer or a cellphone, which also has a removable memory port. The removable memory control unit 102 comprises a signal convertor 112 for converting a removable memory interface to a serial interface. The power supply unit 103 is configured to provide power supply when the device 100 is connected to the equipment 200 and disconnected to the field. The isolation unit 104 is configured to isolate the power supply. For example, a transformer 114 can be used to isolate the power supply.

By the present disclosure, user can easily connect the standalone automation device with the computer or cell phone. In computer or cell phone configuration interface, all the functions in the standalone automation device can be configured easily by input the options or numbers directly. After configuration, the automation device can be disconnected with computer or cell phone and execute process control and monitoring functions. Furthermore, process data can be transmitted to computer or cell phone interface for monitoring and analysis, and users can set or change control parameters easily.

Meanwhile, the present disclosure also provides power supply solution that allows the standalone automation device to work without power supply from the field. The power supply solution also has the isolation unit as the protection circuit, so that common cable is available and no special isolation cable is needed.

In addition, the standalone automation device can be capable of being configured, monitored, and firmware/features updated by the computer or cell phone.

Besides, the standalone automation device can also be removably embedded into the panel of the machine, which is normally working in the field.

It should be understood that the above configuration is merely an embodiment of the present disclosure, and there are other possible ways to set the standalone automation device 100. According to an embodiment of the present disclosure, the isolation unit 104 can further comprises a magnetic coupler 124, to isolate the signals. For instance, the magnetic coupler 124 can be a single or dual channel digital isolator IC, such as SI8421, provided by Silicon Labs. Therefore, the signals and the power can both be isolated from the standalone automation device 100 and the computer or cellphone. Signals are isolated and transmitted via the magnetic coupler and powers are isolated with a transformer.

According to an embodiment of the present disclosure, the removable memory port 101 can be a USB, a mini-USB or a micro-USB port, which is a popular removable memory port. Furthermore, the USB, the mini-USB or the micro-USB port can be arranged in the front panel of the standalone automation device. Accordingly, the signal convertor is a USB to UART convertor. For instance, the USB to UART convertor can be a full speed USB to basic UART IC, such as FT230X provided by FTDI, which offers a compact bridge from USB2.0 Full Speed interfaces to basic UART interfaces.

According to an embodiment of the present disclosure, the USB to UART convertor 112 can be capable of switching the power supply of the standalone automation device 100 between the normal mode and the low current mode, for example, by switching on or off a MOSFET 122. Therefore, it can avoid power supply when the computer or cellphone is suspending, to better protect the computer or cellphone.

Figure 2:
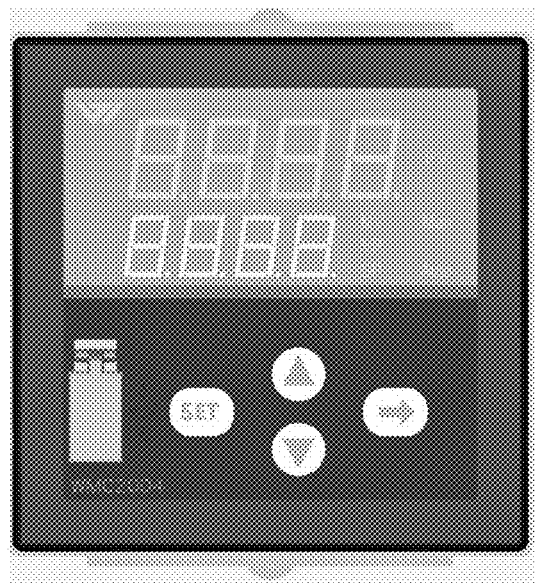
FIG. 2 schematically illustrates a front panel of a standalone automation device according to an embodiment of the present disclosure.

FIG. 2 illustrates a front panel of a standalone automation device according to an embodiment of the present disclosure. As shown in FIG. 2, the standalone automation device typically includes a front panel which has a display and an input means. The display is used for showing information, such as data, status, and so on. The input means may be configured in different forms. For example, a number of conventional buttons may be used as a form of the input means allowing the user to input by pressing the buttons. Also, at least one touch key may be used as another form of the input means allowing the user to input by touching the at least one touch key. However, it should be noted that the existence of the input means is not necessary for the function of the display of the standalone automation device. Further, it is not intended to limit the form of the input means if such input means is provided.

According to an embodiment of the present disclosure, the removable memory port, USB for example, in standalone automation device part is standard mini-USB, USB or micro-USB port, using common cable connecting to computer or cellphone. In order to achieve IP66 protection, mini-USB, USB or micro-USB port can be further covered by a rubber cap.

Figure 3:
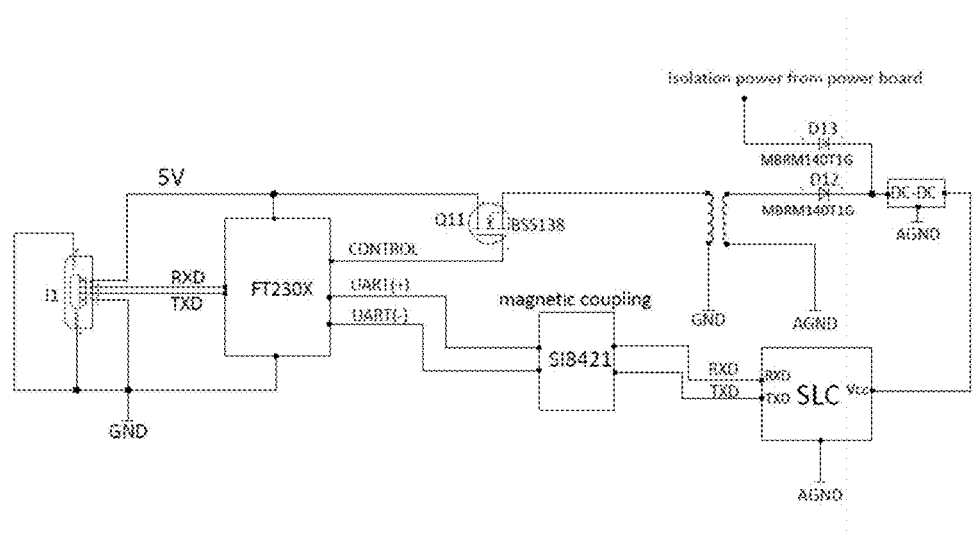
FIG. 3 schematically illustrates an example of the circuit diagram of a standalone automation device according to an embodiment of the present disclosure.

FIG. 3 illustrates an example of the circuit diagram of a standalone automation device according to an embodiment of the present disclosure. As shown in FIG. 3, the USB connection is mainly composed by FT230X IC, SI8421 IC and a DC-DC convector. The USB provide 5V power supply to drive FT230X IC work and then FT230X IC give a high level potential to make Q11 (a MOSFET) on. The DC-DC isolation convertor starts to work that the device can work independently without power supply. At the meantime, FT230X IC convert the USB signals (RXD, TXD) to UART (+) and UART(-) and then SI8421 IC pass them to device by itself.

So that the device can keep communication with computer or cellphone via the USB port. Therefore, the example is totally based on the considering of insulation. The design is divided two parts: the device part and USB control Part. They are isolated from each other. Signals are isolated and transmitted via SI8421 IC and powers are isolated with a transformer. So the two parts can be insulated from preventing high voltage damaging the USB port or electrical shock when the device is powered.

The standalone automation device with isolated power supply in the present disclosure improves the safe connection between the device and the computer or cellphone. Meanwhile, it enables the front panel removable memory connection used for computer or cellphone configuration, data monitoring, firmware and new features update. User can operate standalone by computer or cellphone easily. Front removable memory with power supply allows standalone automation device to do configuration without power supply from field. Removable memory is isolated with MCU inside standalone automation device. So that common cable is enough and no special isolation cable is needed.

Hereinabove, embodiments of the present disclosure have been described in details through embodiments with reference to the accompanying drawings. It should be appreciated that, while this specification contains many specific implementation details, these details should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

The invention claimed is:

1. A standalone automation device, comprising:
   a removable memory port configured to transmit data in signals between the device and equipment which also has a removable memory port connected to the configured removable memory port, wherein the configured removable memory port is at least one of a USB, a mini-USB or a micro-USB port;
   a removable memory control unit comprising a signal convertor connected to the configured removable memory port for converting the signals to UART signals, wherein the signal convertor is a USB to UART convertor;
   a power supply unit configured to provide power supply when the device is connected to the equipment and disconnected to a field of a machine;
   an isolation unit configured to isolate the power supply and isolate the signals between the device and the equipment with a magnetic coupler; and
   wherein the USB to UART convertor is capable of switching the power supply unit of the device between a normal mode and a low current mode, and
   wherein the configured removable memory port the removable memory control unit and the isolation unit are connected in series effective to electrically isolate the configured removable memory port and the removable memory control unit from other components of the standalone automation device including an automation controller of the standalone automation device.

2. The device according to claim 1, wherein the isolation unit comprises a transformer to isolate the power supply.

3. The device according to claim 1, wherein the magnetic coupler comprises a single or dual channel digital isolator IC.

4. The device according to claim 1, wherein the USB to UART convertor is configured to switch on or switch off a MOSFET for switching the power supply of the device between the normal mode and the low current mode.

5. The device according to claim 1, wherein the at least one of the USB, the mini-USB or the micro-USB port is arranged in a front panel of the device.

6. The device according to claim 5, wherein at least one of the USB, the mini-USB or the micro-USB port is covered by a rubber cap.

7. The device according to claim 1, wherein the USB to UART convertor comprises a full speed USB to basic UART IC, which offers a compact bridge from USB2.0 full speed interfaces to basic UART interfaces.

8. The device according to claim 1, further comprising:
   a display and an input means for display, controlling and monitoring.

9. The device according to claim 1, wherein the device is capable of connecting to the equipment through a common cable.

10. The device according to claim 1, wherein the equipment is a computer or a cellphone.

11. The device according to claim 1, wherein the device is capable of being configured, monitored, and firmware/features updated by the equipment using the signals.

12. A machine used in the field, comprising:
   the standalone automation device according to claim 1, which is removably embedded into a panel of the machine.

* * * * *